United States Patent
Szydlowski

(10) Patent No.: US 6,856,978 B2
(45) Date of Patent: Feb. 15, 2005

(54) METHOD AND APPARATUS FOR INTERFACING APPLICATION SYSTEMS VIA THE INTERNET

(75) Inventor: Craig P Szydlowski, Gilbert, AZ (US)

(73) Assignee: Intel Corporation, Santa Clara, CA (US)

(*) Notice: Subject to any disclaimer, the term of this patent is extended or adjusted under 35 U.S.C. 154(b) by 548 days.

(21) Appl. No.: 09/739,931

(22) Filed: Dec. 18, 2000

(65) Prior Publication Data

US 2002/0091974 A1 Jul. 11, 2002

(51) Int. Cl.[7] .............................................. G06F 17/60
(52) U.S. Cl. ....................... 705/64; 709/200; 717/124; 712/227
(58) Field of Search .............. 705/64–69; 707/200–204, 707/100–102; 709/1, 100–104, 200–203; 714/701–703; 717/124–131, 136–141; 712/220, 227

(56) References Cited

U.S. PATENT DOCUMENTS 5,710,917 A * 1/1998 Musa et al. ................. 395/610
5,812,850 A * 9/1998 Wimble ...................... 395/704
6,282,701 B1 * 8/2001 Wygodny et al. ........... 717/125
6,427,151 B1 * 7/2002 Chan et al. .................. 707/101

FOREIGN PATENT DOCUMENTS

EP     0 522 750 A2 * 1/1993    ........... G11B/20/12

OTHER PUBLICATIONS

Self–organizing Systems, RELease 1.0, v89, n6, p1 (9), Jun. 27, 1989, ISSN: 1047–935X.*

* cited by examiner

Primary Examiner—James P. Trammell
Assistant Examiner—Mary Cheung
(74) Attorney, Agent, or Firm—Blakely, Sokoloff, Taylor & Zafman LLP

(57) ABSTRACT

A method and apparatus is provided in which the exchange of data between businesses is facilitated by an electronic interface that comprehends the data mapping and translation requirements of disparate computer application systems. An electronic commerce appliance tracks the data exchanged between an initiator system and a recipient system and determines whether to map, translate, or reject the data before transmitting to or upon receipt by the recipient system. The electronic commerce appliance makes the determination whether to map, translate, or reject data based upon data mapping requirements posted to a data mapping database accessible by both the initiator and recipient systems via the Internet or other communications network.

30 Claims, 5 Drawing Sheets

| DataField | | Initiator Format | Example | Recipient Format | Example |
|---|---|---|---|---|---|
| Date | (411) | American: mon/date/year | 9/30/00 | European: date/mon/year | 30/9/2000 |
| Title | (412) | (field does not exist) | blank | Title | Mr./Mrs./Ms/Herr/Frau |
| Buyer First Name | (413) | 15 alpha characters | Fred | 15 alpha characters | Fred |
| Buyer Last Name | (414) | 15 alpha characters | Smith | 20 alpha characters | Smith |
| Buyer Street | (415) | American: 30 characters | 10 Rose Street | British: 30 characters | Rose Street 10 |
| Phone number | (416) | 10 digits | 408-552-2033 | 15 digits | 408-552-2033 |
| Country phone code | (417) | (field does not exist) | blank | 3 digits | 001 |
| Item | (418) | 30 characters | apples | 30 characters | apples |
| Quantity | (419) | 30 characters | 10 | 30 characters | 4.536 |
| Units | (421) | American Weight | pounds | European weight | kilograms |

Fig. 4

METHOD AND APPARATUS FOR INTERFACING APPLICATION SYSTEMS VIA THE INTERNET

BACKGROUND OF THE INVENTION

1. Field of the Invention

The present invention relates generally to electronic commerce. In particular, the present invention relates to technology that facilitates data interchange between disparate application systems via a communications network.

2. Background Information

Advances in communications technologies have allowed businesses to exchange data electronically for decades in what is now commonly referred to as electronic commerce. There have been a number of approaches to defining standards for data exchange in electronic commerce applications. One of the earliest approaches to standardization is Electronic Data Interchange (EDI). EDI refers to transactions that are exchanged between known trading partners using mutually agreed upon data security, formatting, and transmission standards, such as those developed by the American National Standards Institute (ANSI) Accredited Standards Committee (ASC) X12 in 1989. An international standard, the Electronic Data Interchange for Administration, Commerce, and Transport (EDIFACT), was developed under the auspices of the United Nations and later adopted by ISO in September, 1987. The Federal Acquisition Computer Network (FACNET) is an example of an EDI system authorized by the Federal Acquisition Streamlining Act of 1994, 10 USC §2304(g), and is used to exchange acquisition information between the federal government and private-sector vendors.

Despite its success, the use of EDI to support today's electronic commerce applications has its limitations. EDI transactions use a highly structured and inflexible data format. Since most companies run proprietary business application systems that either do not or cannot use this same standard format for their internal data, both the initiating and receiving companies must each translate the structured data formats into their own internal data formats. Since internal data formats are often modified to accommodate changing business requirements, keeping the translation software up-to-date is not a trivial task.

Another limitation is that the data interchange cannot be performed in real-time. Rather, the EDI transaction must be electronically transported from one computer enterprise to another where the data is then translated or re-entered into a receiving application system before use. However, today's cross-enterprise computer systems often require that the data from the initiating company feed directly into the application system of the recipient company. This presents a problem in that the content and format of the EDI transactions are unlikely to be 100% compatible between the initiator and the recipient.

As an example, state of the art Enterprise Requirements Planning (ERP) systems such as the SAP system are very adept at driving uniform transactions within a company. However, the SAP system is much less adept at communication to external ERP systems. Compatibility issues can occur even when two companies use the same SAP system because it is very likely that the two SAP systems are configured differently. Hence, manual data mapping and translation may be required.

Information technology groups are struggling with data mapping and translation issues. First, business processes to handle transactions with data mapping issues are often poorly defined. Also, many application systems lack mechanisms to resolve data mapping issues once the transaction reaches their domain, or those mechanisms if they do exist are inadequate (e.g., by failing to transmit a clear error report to the initiator). What is needed, therefore, is a new approach to allow companies to develop intelligent electronic interfaces that comprehend the data mapping and translation requirements between disparate application systems.

BRIEF DESCRIPTION OF DRAWINGS

The present invention will be described by way of exemplary embodiments, but not limitations, illustrated in the accompanying drawings in which like references denote similar elements, and in which:

FIG. 4 illustrates an example of data mapping requirements as posted on a data mapping database of the present invention in accordance with one embodiment.

DETAILED DESCRIPTION OF THE INVENTION

In the following description various aspects of the present invention, a method and apparatus facilitates data interchange between disparate application systems via a communications network will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Parts of the description will be presented using terminology commonly employed by those skilled in the art to convey the substance of their work to others skilled in the art, including terms of operations performed by a computer system or electronic commerce application, and their operands, such as transmitting, receiving, retrieving, determining, generating, protocol, data structure, and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
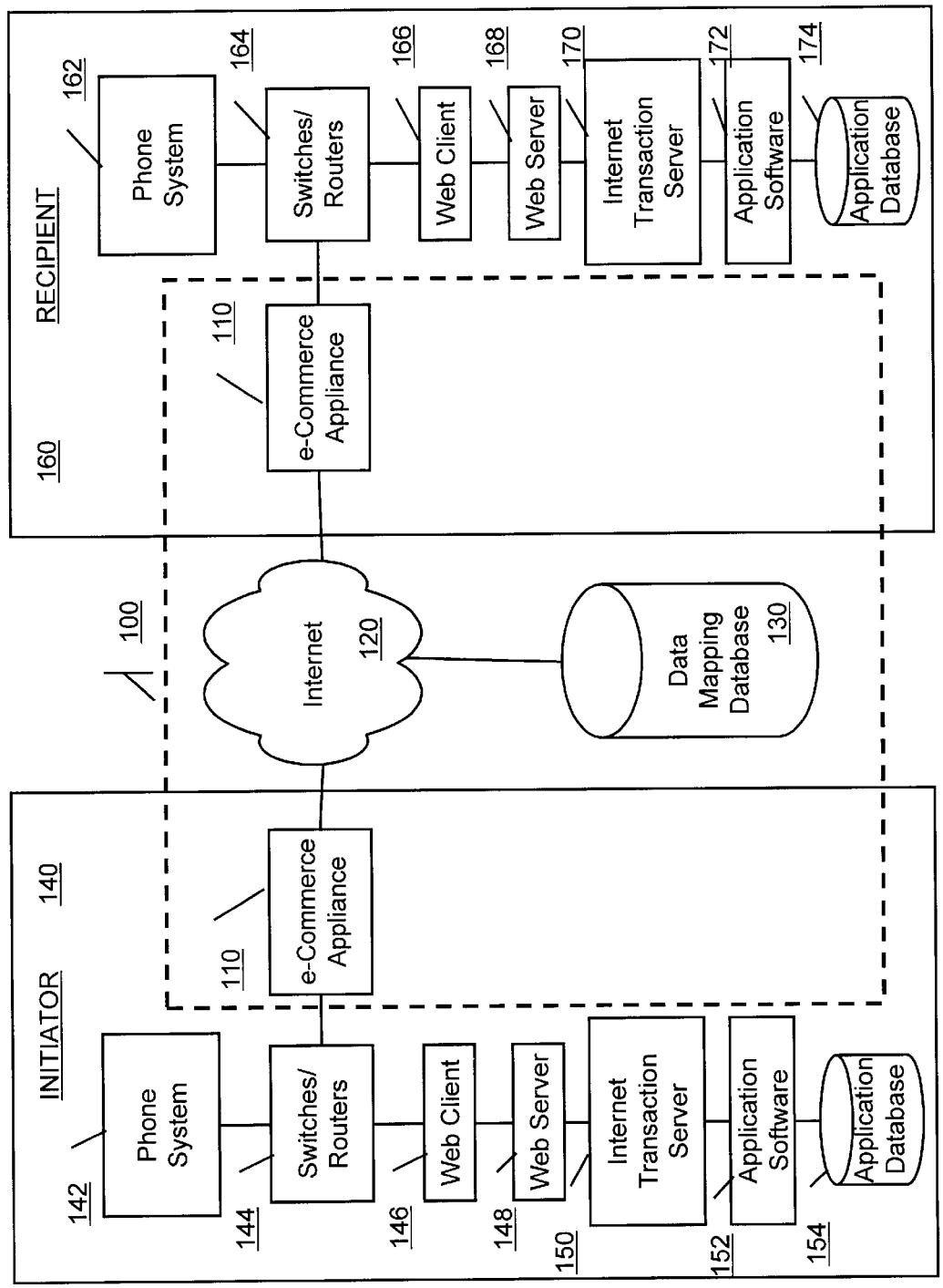
FIG. 1 illustrates an overview of the present invention in the context of an operating environment in accordance with one embodiment.

With reference to FIG. 1, an overview of the present invention is illustrated in the context of an operating environment in accordance with one embodiment. As shown, a method and apparatus is provided in which a initiator system 140 exchanges data with a recipient system 160 over the Internet 120 or other communications network through the use of an e-commerce appliance 110 and a data mapping database 130. In one embodiment, each of the initiator 140 and recipient 160 systems are typically comprised of an application software 152/172 such as an ERP system, and associated application database 154/174. An Internet transaction server 150/170 provides the access to applications that are external to the corporate enterprise (i.e. outside the corporate firewall) via the Internet. Specifically, the Internet transaction server 150/170 provides Internet services that allow the initiator application software 152 to interface with the recipient application software 172 (and vice versa) as well as to other external systems over the Internet 120. The Internet transaction server 150/170 operates in conjunction with: a web server 148/168 and web client 146/166 which together provide a user interface to the external applications, the switches and/or routers 144/164 which control access to the external applications, and a telephone or other type of communication system 142/162 which provides for remotely transmitting and receiving data to and from the external applications.

In one embodiment, the e-commerce appliance 110 is either directly or indirectly coupled to the switches and routers 144/164. Among other things, the e-commerce appliance 110 operates to intercept outgoing data prior to being transmitted to the recipient application software 172 from the initiator application software 152, or to intercept incoming data prior to being received by the recipient application software 172, or some combination thereof. In one embodiment, the e-commerce appliance 110 is implemented in both the initiator 140 and recipient 160 systems, although it may be implemented on one and not the other, or be enabled on one and disabled on the other. When disabled, the data will simply bypass the e-commerce appliance 110 and continue to its destination recipient application software 172 via the switches and routers 164, etc. of the recipient system 160. The e-commerce appliance 110 operates in conjunction with the data mapping database 130, which is accessible to both the initiator 140 and recipient 160 systems via the Internet 120 or some other communications network. In operation, the e-commerce appliance 110 interfaces directly to the communications systems (i.e. the switches and routers 144/164, etc.) that control access to the Internet services for the initiator 140 or recipient 160 systems respectively.

It is readily apparent from these examples that the connections to the Internet or communication network 120 may be a wired or a wireless communication connection. In the case of a wired connection, the communication connection may be a serial or a parallel link, a serial bus, as well as a "harsh environment" local area network segment provided using any one of a number of communication medium known in the art, including but not limited to the Public Switching Telephone Network (PSTN), the Integrated Service Digital Network (ISDN), a Frame Relay network, an Asynchronous Transfer Mode (ATM) network, or the Internet, depending on the requirements of the initiator 140, the recipient 160, and the data mapping database 130 being accessed. In the case of a wireless connection, the communication link may be any wireless network controller designed in accordance with IEEE 802.11 Wireless LAN Standard or a wireless transceiver designed in accordance with the Draft Specification of Bluetooth: A Global Specification for Wireless Connectivity, promulgated by the Bluetooth Special Interest Group. Accordingly, connections to the communication network 120 will not be further described.

Figure 2:
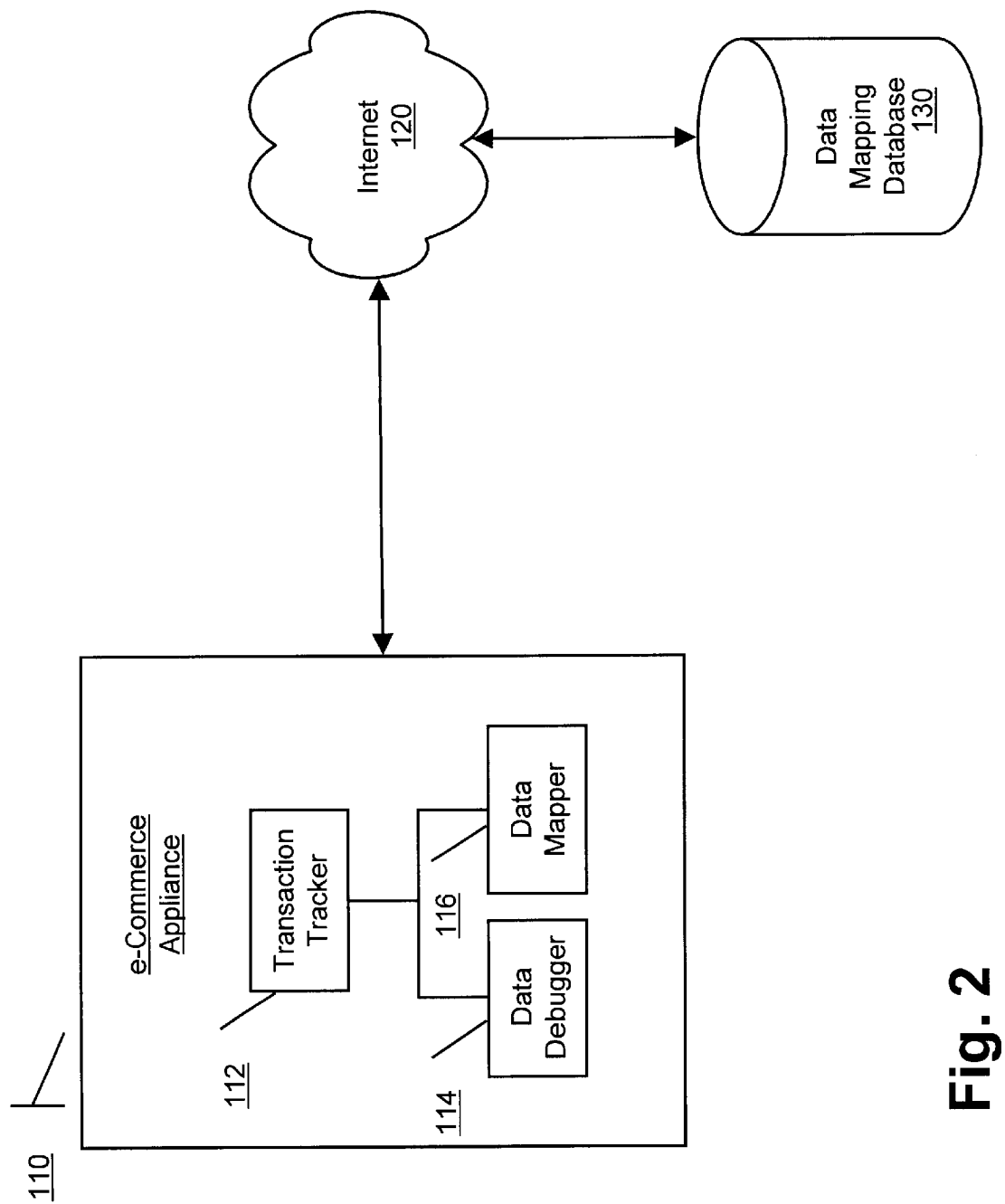
FIG. 2 illustrates an aspect of the present invention in further detail in accordance with one embodiment.

With reference to FIG. 2, one embodiment of the e-commerce appliance 110 is illustrated in further detail. In the illustrated embodiment, the e-commerce appliance 110 is comprised of a transaction tracker 112 logic capable of tracking data between the initiator 140 and recipient 160 systems in order to classify the data as data for which data mapping is fully functional, or as data for which data mapping is still in a debug phase. In one embodiment the tracked data is a communications message that represents a transaction to the application software 152/172. If the data mapping is fully functional, then the transaction is further processed by a data mapper 116 logic that maps the data from the transaction format and content issued by the initiator system 140 into the transaction format and content that is capable of being received by the recipient system 160. However, if the data mapping is still in the debug phase then the transaction is further processed by a data debugger 114 logic capable of identifying which data have unresolved data mapping issues. Both the data mapper 116 and the data debugger 114 logic use data mapping requirements posted on the data mapping database 130 as necessary to perform the proper data mapping or to identify whether and which data mapping issues are present. When data mapping issues are present, the data debugger 114 logic reviews the transaction data format requirements of both the initiator system 140 and the recipient system 160. In this way, discrepancies in the transactions can be identified and potentially repaired before being routed to the application software 172 in the recipient system 160.

Figure 3:
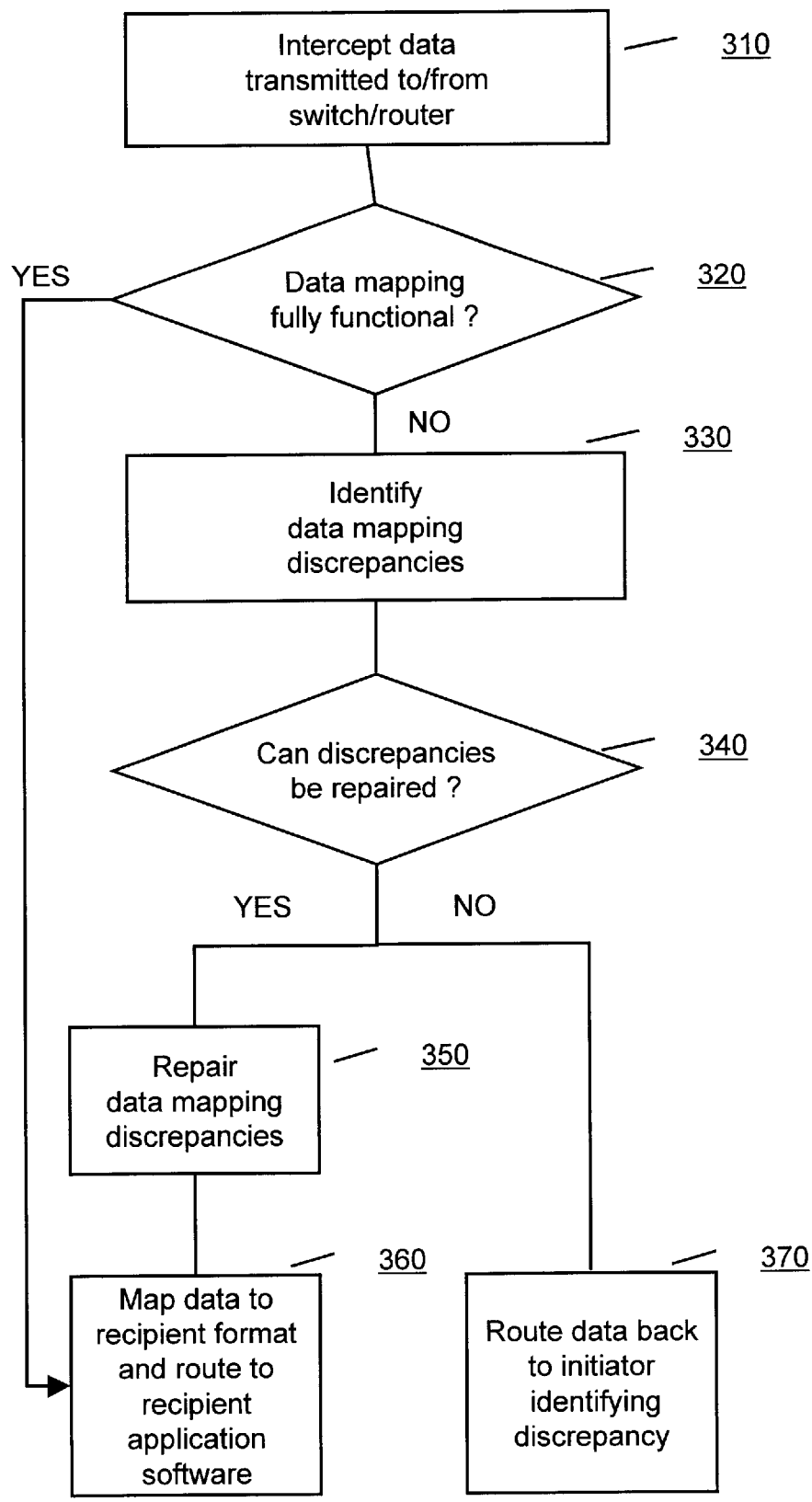
FIG. 3 illustrates a flow diagram of the operation of the present invention in accordance with one embodiment.

Referring now to FIG. 3, a flow diagram of the operation of the e-commerce appliance 110 is illustrated in accordance with one embodiment of the present invention. As shown in process block 310 the operation of the e-commerce appliance 110 begins with intercepting the transaction transmitted from the initiator switch/router 144. In one embodiment, the interception can be performed on the initiator system 140 before the transaction is transmitted to the recipient system 160. In an alternate embodiment, the interception may be performed upon receipt in the recipient system 160 but before the transaction can be routed to the recipient application software 172. It should be understood that the transaction may be intercepted at other points in the process without departing from the principles of the invention as long as the interception occurs before the transaction is processed by the recipient application system 172.

At process block 320, the intercepted transaction is identified with reference to the corresponding data mapping requirements posted on the data mapping database 130. Specifically, if the data mapping for the intercepted transaction is determined to be fully functional, then the operation of the e-commerce appliance 110 continues at process block 360, in which the e-commerce appliance proceeds to map the intercepted transaction data to the recipient data format as identified in the corresponding data mapping requirements.

If the data mapping for the intercepted transaction is determined not to be fully functional, then the operation of the e-commerce appliance 110 continues at process block 330. Specifically, the discrepancies causing the data mapping not to be fully functional are identified with reference to the corresponding data mapping requirements posted on the data mapping database 130. At process block 340, if it is determined that the discrepancies can be repaired, then the operation of the e-commerce appliance 110 continues at process block 350. There, the data mapping discrepancies are repaired with reference to the corresponding data mapping requirements. If, on the other hand, the data discrepancies cannot be repaired, then the intercepted data is routed back to the initiator along with information that identifies the particular reason for the discrepancy (i.e. why the transaction is being returned or rejected).

In one embodiment, the data mapping requirements posted to the data mapping database 130 are actually derived from the requirements of the initiator and recipient application software 152/172 and the different formats of transactions processed by those applications. With reference to FIG. 4, an example transaction is illustrated in accordance with one embodiment of the present invention. In the illustrated embodiment in FIG. 4, thee-commerce appliance 110 derives the data mapping requirements for a purchase order 400 from the initiator formats 420 and recipient formats 440 for data fields 410. Further illustrated are examples of initiator data field values 430 and recipient data field values 450 according to their respective formats 420/440. As can be seen, for many of the data fields 410 the data remains in the same format; therefore, no mapping is required. Other data fields 410 do require mapping, either to reformat the data to conform to the recipient format 440, or in some cases to change the data field value 430/450 altogether (i.e. to translate or transform the data) to conform the initiator data values to certain customary recipient data values.

An example of a mapping requirement to reformat the data to conform to the recipient format 440 is shown in several of the data fields in the illustrated purchase order 400. For example, if the initiator of the purchase order 400 is an American buyer, and the recipient is a European seller, the data field Date 411 is formatted as month/date/year (e.g. 09/30/2000) using the initiator format 420, but as day/month/year (e.g. 30/09/2000) using the recipient format 440. Similarly, the data field Street Address 415 is formatted with the street number before the street name using the initiator format 420, but with the street number after the street name using the recipient format 440. The data field Phone Number 416 is formatted as 10 digits using the initiator format 420 but as 15 digits using the recipient format 440.

An example of a mapping requirement to change the data field values altogether to conform the initiator data values 430 to certain customary recipient data values 450 is also shown in several of the data fields in the illustrated purchase order 400. For example, the data field Quantity 419 and Units 421 are expressed using the initiator format 420 for the United States Customary Unit (Avoirdupois Weight) for weight in pounds, or as shown in the example 430, 10 pounds. But in the metric equivalent of weight for the European recipient format 440, the data field Quantity 419 and Units 421 must be expressed in terms of kilograms, or as shown in the example 450 as 4.536 kilograms, thus requiring the data field values to be transformed or translated from the American value to the European value. Another example is if the initiator purchase order 400 is missing a value for the data field country telephone code 417. A data mapping requirement might be to read the data field country name (not shown) and use a look-up table to determine the corresponding value for the data field country telephone code 417.

Numerous other mapping requirements may be derived depending on the type of transaction and the various initiator formats 420 and recipient formats 440 involved in the particular exchange of data. Once derived, the e-commerce appliance has three possible courses of action. The first two courses of action have been previously described as 1) to map the intercepted transaction data to the recipient data format 430 as identified in the corresponding data mapping requirements, and 2) to determine that the mapping requirements are not fully functional and return the intercepted transaction data to the initiator for further processing. As illustrated in the example in FIG. 4, in one embodiment the mapping may require reformatting the data or converting the data to an altogether different value. In one embodiment the return of an intercepted transaction to the initiator may entail also returning information identifying the nature of the discrepancy in the initiator and recipient data formats. This may include not only returning the information about the intercepted transaction the initiator, but also to the recipient. The third possible course of action is to further determine that the discrepancies identified for the intercepted transaction are such that they may be ignored or bypassed without harm to the exchange of data between the initiator application software 152 and the recipient application software 172. For example, the data field for title 412, such as shown in the example 450, Mr./Mrs./Ms/Herr/Frau, may be deemed as not required and the recipient may accept the initiator purchase order 400 without data specified for the data field title 412.

Figure 5:
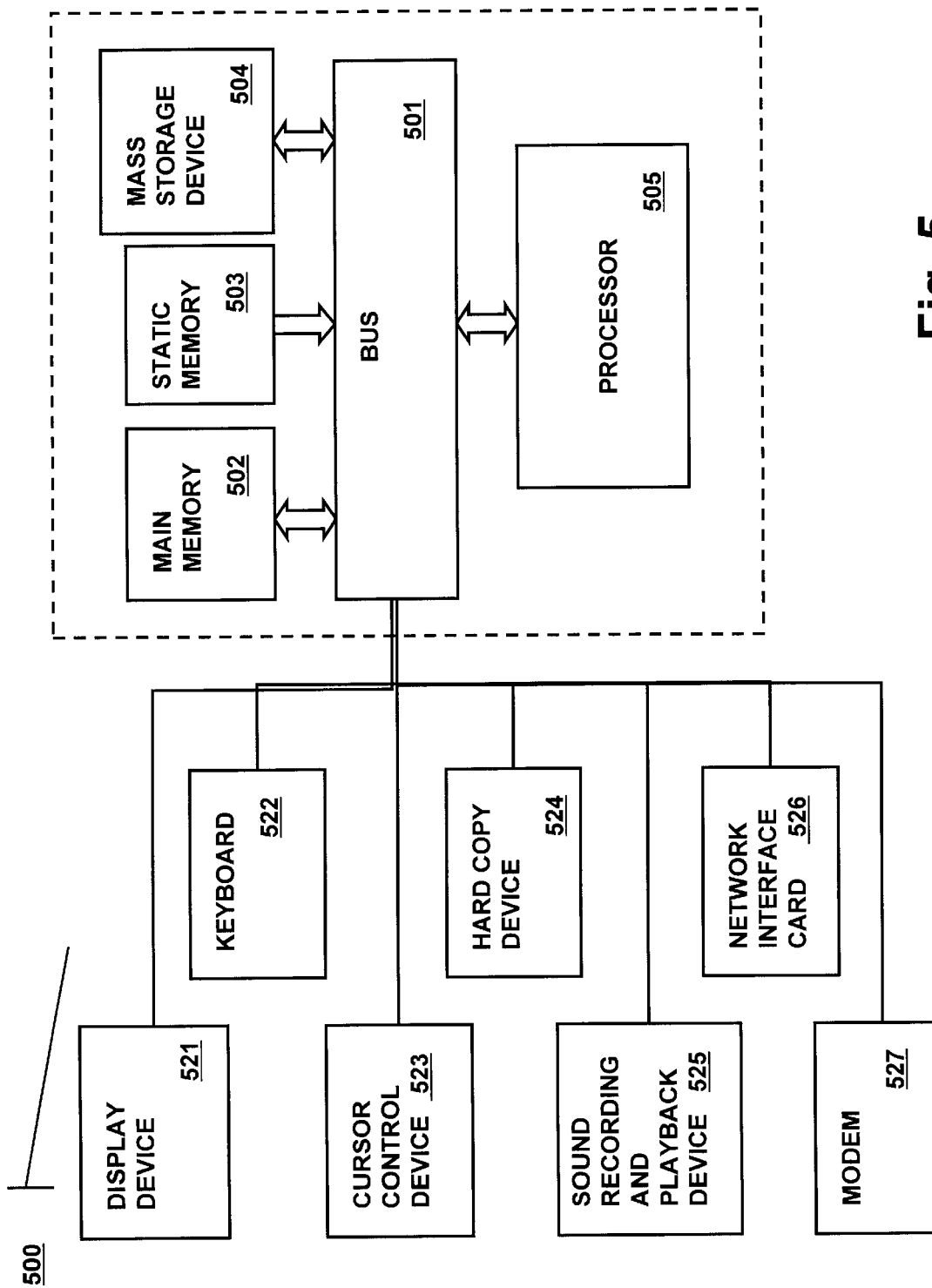
FIG. 5 illustrates a general-purpose computer system upon which an embodiment of the present invention may be implemented.

Referring now to FIG. 5, wherein a block diagram of a general-purpose computer system upon which an embodiment of the method and apparatus for interfacing application systems via a communications network may be implemented is shown. As illustrated, general-purpose computer system 500 comprises a bus 501, or other communications hardware and software, for communicating information, and a processor 502 coupled with bus 501 for processing information. Computer system 500 further comprises a random access memory (RAM) or other dynamic storage device 502 (referred to as main memory), coupled to bus 501 for storing information and instructions to be executed by processor 502. Computer system 500 also comprises a read only memory (ROM) 503, and/or other static storage device, coupled to bus 501 for storing static information and instructions for processor 502. Mass storage device 504 is coupled to bus 501 for storing information and instructions. In one embodiment, mass storage device 504 includes a repository for storing the data mapping requirements in data mapping database 130.

Furthermore, mass storage device 504, such as a magnetic disk or optical disk, and its corresponding disk drive, can be coupled to computer system 500. Computer system 500 can also be coupled via bus 501 to a display device 521 for displaying information to a computer user. Display device 521 is used to display a graphical user interface to the data mapping database 130 or to other aspects of the present invention. Display device 521 can include a frame buffer, specialized graphics rendering devices, a cathode ray tube (CRT), and/or flat panel display. An alphanumeric input device 522, including alphanumeric and other keys, is typically coupled to a bus 501 for communicating information and command selections to processor 505. Another type of user input device is a cursor control device 523, such as a mouse, a trackball, a pen, a touch screen, or cursor direction keys for communicating direction information and command selections to processor 505, and for controlling cursor movement on display device 521. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom.

Another device that may be coupled to bus 501 is a hard copy device 524 which may be used for printing instructions, data, or other information on a medium such as paper, film, or similar types of media. Additionally, computer system 500 can be coupled to a device for sound recording, and/or playback 525, such as an audio digitizer coupled to a microphone for recording information. Further, the device may include a speaker that is coupled to a digital to analog (D/A) converter for playing back the digitized sounds.

Network interface card 526 is coupled to bus 501. Network interface card 526 is further coupled to an external computer network (not shown). Network interface card 526, in conjunction with appropriate data communications protocols (e.g., the TCP/IP suite of internetworking protocols), provide the means by which an embodiment of the present invention operating on a general-purpose computer system 500 exchanges information with other devices coupled to the same computer network. Modem 527 is coupled to bus 501, and provides an alternate means of exchanging information with other devices for which a modem connection to an external computer network or device (not shown) can be established.

Computer system 500 and application instructions, logic, firmware, or software, stored and executed therein as part of the method and apparatus of the present invention, operate in conjunction with an operating system with graphics capability, such as Microsoft's Windows or Windows CE operating systems. Commercially available computer systems implementing the features of general-purpose computer system 500 include a broad range of operating system-based computers, including server computers, desktop computers, workstations, personal digital assistants, devices, or other computer appliances. Furthermore, the present invention may be used in conjunction with various browsers (e.g. Microsoft Internet Explorer or Netscape Navigator) designed for both conventional and wireless web servers and various electronic mail applications (e.g. Microsoft Outlook, and Lotus Notes) or other messaging applications to yield an operational platform upon which an embodiment of the present invention may be implemented.

Accordingly, a novel method and apparatus is described in which an e-commerce appliance facilitates the interface between disparate application systems via a communications network such as the Internet using a commonly accessible data mapping database. From the foregoing description, those skilled in the art will recognize that many other variations of the present invention are possible. In particular, while the present invention has been described as being implemented in components of the initiator system 140, the recipient system 160, an e-commerce appliance 110, and a data mapping database 130, some of the functions performed by those components may be distributed in other components of a general-purpose computer system 500. Thus, the present invention is not limited by the details described. Instead, the present invention can be practiced with modifications and alterations within the spirit and scope of the appended claims.

What is claimed is:

1. An apparatus comprising:
    a transaction tracker connected to a communication network to intercept a transaction from an initiator, prior to processing of the transaction by a recipient;
    a data mapping database accessible to the transaction tracker via the communication network, the data mapping database having stored thereon an initiator format and a recipient format corresponding to the intercepted transaction;
    a data debugger coupled to the transaction tracker to determine whether data from the intercepted transaction can be mapped from the initiator format to the recipient format, and if not, to further determine a reason why the intercepted transaction cannot be mapped and to return the intercepted transaction to the initiator along with the reason; and
    a data mapper coupled to the transaction tracker to map data from the intercepted transaction which the data debugger has determined can be mapped from the initiator format to the recipient format.

2. The apparatus of claim 1 wherein the data mapper maps data from the initiator data format to the recipient data format by deriving a data mapping requirement from the initiator data format and the recipient data format.

3. The apparatus of claim 2 wherein the data mapping requirement comprises reformatting an intercepted transaction data length to a new length.

4. The apparatus of claim 2 wherein the data mapping requirement comprises transforming an intercepted transaction data order to a new order.

5. The apparatus of claim 2 wherein the data mapping requirement comprises translating an intercepted transaction data value to a new value.

6. The apparatus of claim 2, wherein the intercepted transaction data value is missing, and the new value is determined from a data source.

7. The apparatus of claim 6, wherein the data source comprises a second intercepted transaction data value.

8. The apparatus of claim 7, wherein the data source further comprises a lookup table obtained from the data mapping requirement.

9. The apparatus of claim 2 wherein the data mapping requirement is obtained directly from a stored data mapping requirement previously stored on the data mapping database.

10. The apparatus of claim 1, wherein the data debugger further transmits the reason why the intercepted transaction cannot be mapped to the recipient.

11. The apparatus of claim 1, wherein the transaction tracker is connected to a switch of the communication network, the switch controlling access to an application software of the initiator.

12. The apparatus of claim 11, wherein the switch controls access to an application software of the recipient.

13. A method comprising:
    intercepting a transaction from an initiator, prior to processing of the transaction by a recipient;
    obtaining from a data mapping database a data mapping requirement for the transaction, the data mapping requirement comprising an initiator data format and a recipient data format;
    determining whether data from the intercepted transaction can be mapped from the initiator format to the recipient format, and if not, further determining a reason why the intercepted transaction cannot be mapped and returning the intercepted transaction to the initiator along with the reason; and
    mapping data from the intercepted transaction that can be mapped from the initiator data format to the recipient data format.

14. The method of claim 13, wherein the data mapping requirement is derived from the initiator data format and the recipient data format.

15. The method of claim 13, wherein the data mapping requirement comprises reformatting an intercepted transaction data length to a new length.

16. The method of claim 13, wherein the data mapping requirement comprises transforming an intercepted transaction data order to a new order.

17. The method of claim 13, wherein the data mapping requirement comprises translating an intercepted transaction data value to a new value.

18. The method of claim 17, wherein the intercepted transaction data value is missing, and the new value is determined from a data source.

19. The method of claim 18, wherein the data source comprises a second intercepted transaction data value.

20. The method of claim 19, wherein the data source further comprises a lookup table obtained from the data mapping requirement.

21. The method of claim 13, further comprising transmitting the reason why the intercepted transaction cannot be mapped to the recipient.

22. An article of manufacture comprising:
a computer-readable medium having computer-executable instructions for performing:
intercepting a transaction from an initiator, prior to processing of the transaction by a recipient;
obtaining from a data mapping database a data mapping requirement for the transaction, the data mapping requirement comprising an initiator data format and a recipient data format;
determining whether data from the intercepted transaction can be mapped from the initiator format to the recipient format, and if not, further determining a reason why the intercepted transaction cannot be mapped and returning the intercepted transaction to the initiator along with the reason; and
mapping data from the intercepted transaction that can be mapped from the initiator format to the recipient format.

23. The article of manufacture of claim 22, wherein the instructions for performing obtaining the data mapping requirement include deriving the data mapping requirement from the initiator data format and the recipient data format.

24. The article of manufacture of claim 22, wherein the data mapping requirement further comprises instructions to reformat an intercepted transaction data length to a new length.

25. The article of manufacture of claim 22, wherein the data mapping requirement further comprises instructions to transform an intercepted transaction data order to a new order.

26. The article of manufacture of claim 22, wherein the data mapping requirement further comprises instructions to translate an intercepted transaction data value to a new value.

27. The article of manufacture of claim 26, wherein the instructions to translate an intercepted transaction data value to a new value include determining the new value from a data source when the intercepted transaction data value is missing.

28. The article of manufacture of claim 27, wherein the data source comprises a second intercepted transaction data value.

29. The article of manufacture of claim 28, wherein the data source further comprises a lookup table obtained from the data mapping requirement.

30. The article of manufacture of claim 22, further comprising instructions for transmitting the reason why the intercepted transaction cannot be mapped to the recipient.

* * * * *